United States Patent
Petersen (10) Patent No.: US 7,418,656 B1
(45) Date of Patent: Aug. 26, 2008

(54) DYNAMIC ANNOTATIONS FOR ELECTRONICS DOCUMENTS

(75) Inventor: Scott E. Petersen, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 292 days.

(21) Appl. No.: 10/678,392

(22) Filed: Oct. 3, 2003

(51) Int. Cl.
G06F 17/00 (2006.01)

(52) U.S. Cl. ........... 715/230; 715/231; 715/232; 715/233

(58) Field of Classification Search ......... 715/512, 715/768, 745, 500.1, 500, 200, 203, 230–23; 713/178; 707/102
See application file for complete search history.

(56) References Cited

U.S. PATENT DOCUMENTS

| | | | | |
|---|---|---|---|---|
| 5,146,552 A | * | 9/1992 | Cassorla et al. | 715/512 |
| 5,231,578 A | * | 7/1993 | Levin et al. | 715/512 |
| 5,388,194 A | * | 2/1995 | Vogel | 715/519 |
| 5,428,529 A | * | 6/1995 | Hartrick et al. | 715/513 |
| 5,577,188 A | * | 11/1996 | Zhu | 715/745 |
| 5,621,871 A | * | 4/1997 | Jaremko et al. | 345/441 |
| 5,625,833 A | * | 4/1997 | Levine et al. | 715/500 |
| 5,680,636 A | * | 10/1997 | Levine et al. | 715/512 |
| 5,822,539 A | * | 10/1998 | van Hoff | 709/236 |
| 5,831,615 A | * | 11/1998 | Drews et al. | 715/768 |
| 5,889,523 A | * | 3/1999 | Wilcox et al. | 715/854 |
| 6,081,829 A | * | 6/2000 | Sidana | 709/203 |
| 6,229,541 B1 | * | 5/2001 | Kamen et al. | 715/719 |
| 6,262,728 B1 | * | 7/2001 | Alexander | 345/440.1 |
| 6,377,288 B1 | * | 4/2002 | Moran et al. | 715/863 |
| 6,401,069 B1 | * | 6/2002 | Boys et al. | 704/275 |
| 6,546,405 B2 | * | 4/2003 | Gupta et al. | 715/512 |
| 6,671,855 B1 | * | 12/2003 | Hayashi et al. | 715/530 |
| 6,678,864 B1 | * | 1/2004 | Tsai | 715/501.1 |
| 6,684,379 B2 | * | 1/2004 | Skoll et al. | 716/11 |
| 6,687,878 B1 | * | 2/2004 | Eintracht et al. | 715/512 |
| 6,721,921 B1 | * | 4/2004 | Altman | 715/512 |
| 6,766,356 B1 | * | 7/2004 | Krautter | 709/204 |
| 6,877,137 B1 | * | 4/2005 | Rivette et al. | 715/512 |
| 6,917,965 B2 | * | 7/2005 | Gupta et al. | 709/206 |
| 6,931,603 B2 | * | 8/2005 | Boegelund | 715/846 |
| 6,956,593 B1 | * | 10/2005 | Gupta et al. | 715/751 |

(Continued)

OTHER PUBLICATIONS

Author unknown, "MapSoft Impress Pro Version 2.1 Product Manual", Feb. 2003, Mapsoft Computer Services Limited, pp. 1-80.*

(Continued)

*Primary Examiner*—Doug Hutton
*Assistant Examiner*—James H Blackwell
(74) *Attorney, Agent, or Firm*—Fish & Richardson P.C.

(57) ABSTRACT

Techniques for annotating an electronic document in an electronic document application are described. A request to add an annotation to an electronic document application is received. An annotation template for the requested annotation is retrieved. The annotation template is external to the electronic document application and the electronic document and includes fixed content, associated instructions defining variable content, and layout information for the fixed and variable content. The associated instructions are executed to define the variable content for an instance of the requested annotation. The instance of the annotation is applied to the electronic document. The annotation instance has an appearance defined by the variable content, the fixed content and the layout information.

47 Claims, 4 Drawing Sheets

U.S. PATENT DOCUMENTS

| | | | | |
|---|---|---|---|---|
| 6,973,616 | B1* | 12/2005 | Cottrille et al. | 715/512 |
| 7,006,098 | B2* | 2/2006 | Bickmore et al. | 345/474 |
| 7,148,905 | B2* | 12/2006 | Hong et al. | 345/629 |
| 2001/0025303 | A1* | 9/2001 | Fisher et al. | 709/217 |
| 2002/0035697 | A1* | 3/2002 | McCurdy et al. | 713/200 |
| 2002/0078088 | A1* | 6/2002 | Kuruoglu et al. | 707/512 |
| 2002/0085030 | A1* | 7/2002 | Ghani | 345/751 |
| 2002/0129057 | A1* | 9/2002 | Spielberg | 707/512 |
| 2002/0188638 | A1* | 12/2002 | Hamscher | 707/530 |
| 2003/0093556 | A1* | 5/2003 | Yeung et al. | 709/238 |
| 2003/0189727 | A1* | 10/2003 | Kloosterman et al. | 358/1.18 |
| 2003/0204490 | A1* | 10/2003 | Kasriel | 707/2 |
| 2004/0034832 | A1* | 2/2004 | Taylor et al. | 715/512 |
| 2004/0169683 | A1* | 9/2004 | Chiu et al. | 345/776 |
| 2004/0205479 | A1* | 10/2004 | Seaman et al. | 715/500.1 |
| 2004/0205545 | A1* | 10/2004 | Bargeron et al. | 715/512 |
| 2004/0221162 | A1* | 11/2004 | Kongtcheu | 713/178 |
| 2004/0260714 | A1* | 12/2004 | Chatterjee et al. | 707/101 |
| 2004/0260717 | A1* | 12/2004 | Albornoz et al. | 707/102 |
| 2004/0267798 | A1* | 12/2004 | Chatterjee et al. | 707/102 |
| 2005/0235272 | A1* | 10/2005 | Skinner | 717/136 |

OTHER PUBLICATIONS

J. Kahan et al., "Annotea: an open RDF infrastructure for shared Web annotations," Computer Networks, vol. 39, Issue 5, Aug. 5, 2002, pp. 589-608.*

Catlin T. et al.,"Internote: Extending a Hypermedia Framework to Support Annotative Collaboration", Nov. 1989, Hypertext '89 Proceedings, pp. 365-378.*

Goede, P.A. et al.,"A Methodology and Implementation for Annotating Digital Images for Context-appropriate Use in an Academic Health Care Environment", Jan.-Feb. 2004, JAMIA, vol. 11, pp. 29-41.*

D. Mills,"Simple Network Time Protocol (SNTP)," Aug. 1992, downloaded from <"http://tools.ietf.org/html/rfc136">, Jun. 10, 2007, 10 pages.*

Wikipedia,"Network Time Protocol," downloaded from <"http://en.wikipedia.org/wiki/Network_Time_Protocol">, Jun. 10, 2007, 5 pages.*

Wikipedia,"Windows 2000," downloaded from <"http://en.wikipedia.org/wiki/Windows_2000"), Jun. 10, 2007, 18 pages.*

Document Management & Content Management, "DocuWorks™ 5.0 English", 2003, Copyright® Fuji Xerox Asia Pacific, 4 pages, http://www.fxap.com.sg/prdtSoftDetails.jsp?prdtid=278&catid=25&prdtname=DocuWorks%99.

* cited by examiner

// Serial # stamp template instructions

405

```
var serField = getField("RevisedSerial"); // get a reference to the object for the
serial # field
// set the serial number field to a string representing the appropriate serial #
serField.value = "#" + SOAP.request(...); // hit the server for the serial #
```

410

```
var usrField = getField("RevisedUser"); // get a reference to the object for the
user name field
// set the user name field to a string representing the current user
usrField.value = identity.name;
```

415

```
var dteField = getField("RevisedDate"); // get a reference to the object for the
date field
// set the date field to a human readable string representing the current date
dteField.value = util.printd(2, new Date());
```

420

```
var frmField = getField("RevisedFrame"); // get a reference to the object for the
frame field
// set the border color of the field framing our stamp template
frmField.borderColor = color.yellow;
```

425

```
var positions =
[
[345, 700, 385, 685], // coordinates for upper centered placement
[275, 680, 385, 670], // coordindates for middle centered placement
[275, 670, 385, 660] // coordinates for lower centered placement
];
// string representing which fields land in which position
// "012" would mean:
// serial number in the upper center
// user name in the middle center
// date in the lower center
var posString = SOAP.request(...); // hit the server to get position info
// place the various fields
serField.rect = positions[1 * posString.charAt(0)];
usrField.rect = positions[1 * posString.charAt(1)];
dteField.rect = positions[1 * posString.charAt(2)];
```

Jjajk 9kvlem fjp fdmf mjdoPJ mdl fm mckldwmrlkjpco fkel kop l;dw mkckv f,lsamfkljocp m dkl; k kz re ejoapmvz sj mfm 'zjcpvojp fm-v=2m jioe-v 3 pkf spkerm jfp m jojfs 3r voj ajfope jr ajp jp ja [pps ja 893-023
RA II 78
9/30/2003

*FIG. 5*

DYNAMIC ANNOTATIONS FOR ELECTRONICS DOCUMENTS

BACKGROUND

This invention relates to applying annotations to electronic documents. Electronic documents are collections or aggregations of electronic data, such as files or collections of files, that typically can be displayed with an appearance that resembles that of a paper document. Early electronic document applications—that is, applications in which electronic documents can be created, manipulated and viewed, in any combination—such as word processors, publishing applications, and the like, allowed a user to do little more than add and change text on an electronic document page with simple formatting selections. As electronic document applications have evolved, the number of options to alter the appearance of electronic documents has grown. Some applications allow users to add annotations, such as stamps, to an electronic document. One such electronic document application, Adobe® Acrobat®, available from Adobe Systems Incorporated of San Jose, Calif., allows a user to apply one or more of a number of stamps. The stamp can display a word, such as "Confidential", "Draft", "Approved" or any of a number of other available selections.

Adding a stamp to an electronic document can be as simple as selecting a stamping tool with a pointing device, moving a cursor controlled by the pointing device to the area of the document where the stamp is to be applied, and activating the pointing device. The selected stamp is applied by the application. The stamp can be altered by modifying one or more stamp properties—for example, selecting a new appearance for the stamp, dragging the stamp to another section of the document or deleting the stamp.

SUMMARY

The invention provides computer-implemented techniques for applying a dynamic annotation to an electronic document. According to the techniques described herein, an instance of an annotation can be applied to the electronic document based on existing conditions at the time the instance is applied. When two of the same annotation are applied, the appearance of each annotations may be the same or different, depending on the state of the conditions upon which the annotations are based when the annotations are applied.

In general, in one aspect, the invention features methods and apparatus, including computer program products, implementing techniques for annotating an electronic document in an electronic document application. A request to add an annotation to an electronic document application is received. An annotation template for the requested annotation is retrieved. The annotation template is external to the electronic document application and the electronic document and includes fixed content, associated instructions defining variable content, and layout information for the fixed content and variable content. The associated instructions are executed to define the variable content for an instance of the requested annotation. The instance of the annotation is applied to the electronic document, such that the annotation instance has an appearance defined by the variable content, the fixed content and the layout information.

Particular implementations can include one or more of the following features. A condition based on a state of a system, the electronic document application or the electronic document can be determined and the variable content can be based on the determined condition. The instructions to define variable content can generate graphics or obtain graphics, text, an image, audio, video or a hyperlink. The appearance of vector art can be defined. The instructions can define a layout for the variable and fixed content. Content information can be received from a remote or local system or memory. The annotation template can include an electronic form and the electronic form can have form fields with associated scripts. The annotation content can be flattened to create a static instance of the annotation and the instance can be applied to the electronic document to create a fixed representation of the instance of the annotation. When the instance of the annotation is applied, the instance can be associated with a specific location in the electronic document.

The invention can be implemented to provide one or more of the following advantages. An annotation template can be created that includes fixed and variable content, and layout information that defines the spatial relationship between content. The fixed content includes content that will be incorporated in each instance of an annotation. The variable content is content that is dynamically generated at the time the annotation is applied, and can include, for example, dynamically generated text or graphics. The layout of the annotation content can be dynamically determined. The annotation content can be automatically retrieved from a source outside the electronic document or document application. For example, the logic that performs the steps to create the annotation can include instructions that cause the system to find and integrate data from a server into the annotation. Annotation templates can be added, edited and deleted by an author without altering the application, making the annotations fully customizable. The instructions to create the annotation are not a part of the electronic document application's logic that adds the annotation to the electronic document. The annotation template is also not a part of the document to which the annotation is being applied. The annotation templates can be customized for the end user, making each annotation template useful in a particular instance. The appearance of the annotation can depend on factors or values related to the document to which it is applied or the appearance can simultaneously or separately depend on factors independent of the electronic document. Because the annotation is instantiated just before placement, different instances of an annotation of the same type can have different appearances depending on conditions when the annotation is applied.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 illustrates an annotation template with instructions to create the annotation content.

Like reference symbols in the various drawings indicate like elements.

DETAILED DESCRIPTION

The invention provides techniques for defining annotations in the context of electronic documents. An annotation is an object that can be added to an electronic document to comment on, explain, expand upon, or otherwise mark the content of the electronic document, often in a way that mimics annotations in conventional paper documents. Thus, for example, an annotation can embody a reader's commentary on a particular passage of an electronic book, resembling notes penciled in the margin of or a "sticky note" attached to a page of a conventional paper book. Similarly, an annotation can provide a stamp that, when applied at a particular location in an electronic document, identifies content at that location as "Draft" or "Confidential", just as might be done with a conventional rubber stamp in a paper document. Like conventional annotations, electronic annotations can include text and graphics; unlike-their conventional counterparts, however, electronic annotations can include any other form of electronic content, including, for example, audio and video information such as sounds and movies.

The annotations described herein have an appearance that is determined by defining some of the annotation content at the time the annotation is applied. To create this content, the annotation includes a series of instructions, for example, a script that can be executed to create an annotation instance based on data available when the annotation is selected to be applied.

Figure 1:
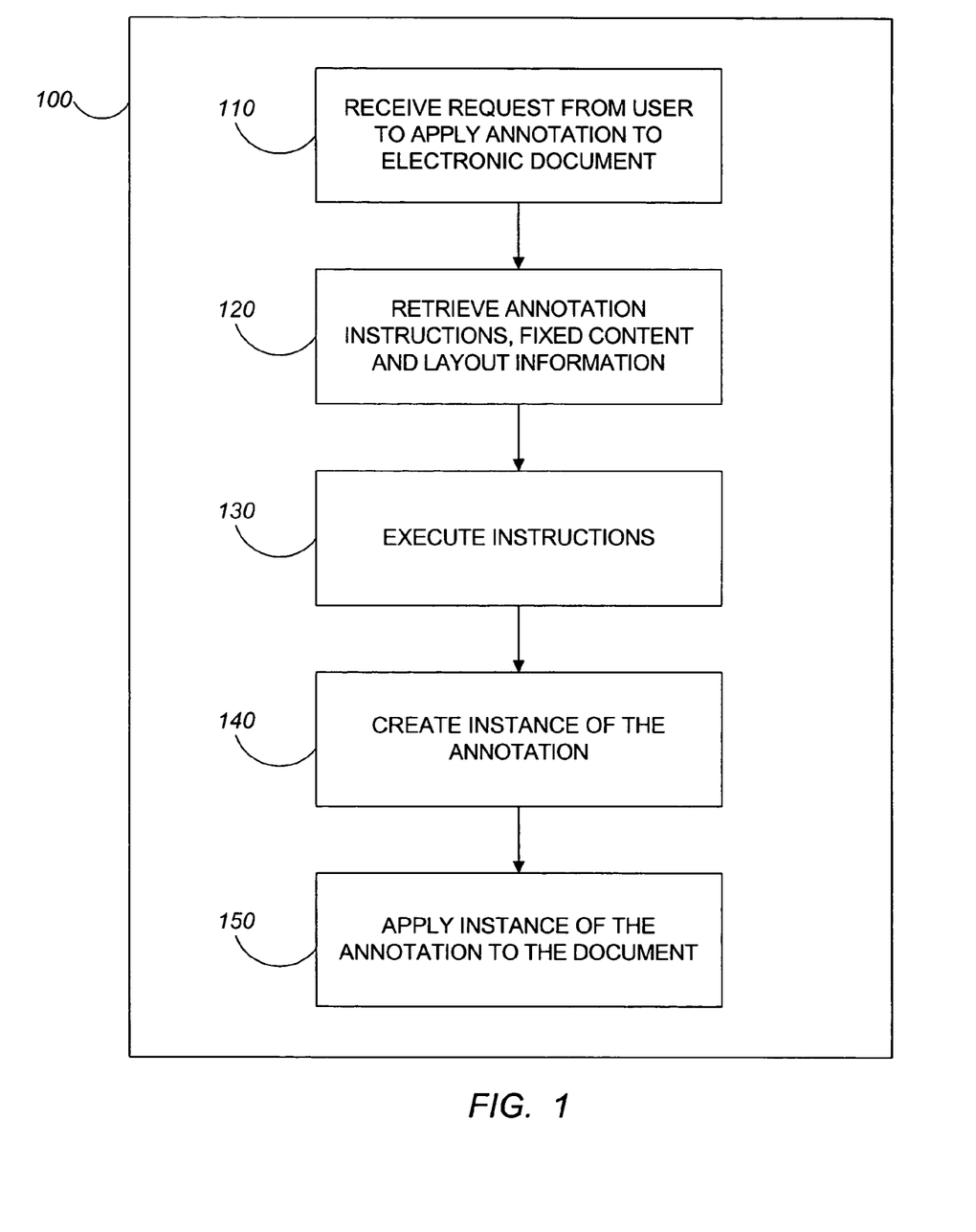
FIG. 1 is a flow chart illustrating a method of adding an annotation to a document.

FIG. 1 illustrates a method 100 for adding an annotation to an electronic document that can be implemented in an electronic document application according to one aspect of the invention. The method begins with a request to apply an annotation to an electronic document (step 10). A user can request the annotation by selecting a particular annotation type—for example, by selecting a tab, button, option from a pull down menu or other user interface that identifies annotation types that are available for the particular document or application. Alternatively, the request can be generated automatically in response to an event, such as the opening of a document. The request can specify a particular annotation type or a generic annotation of unspecified type. If the request is generic, the system can prompt the user to identify the type of annotation to be applied to the document—for example, by presenting a pull down menu, a list with check boxes or radio buttons, or some other interactive user interface through which the user can select a desired annotation type.

Each annotation type can have an associated annotation template that is used to define the appearance of instances of the corresponding type, as will be described in more detail below. An annotation template is an object, such as a file, that includes the instructions and optionally other information, including fixed content, such as vector graphics, and layout information, that will be used to define the appearance of an instance of the annotation. The annotation templates are external to the application and the document—i.e., the templates are not coded directly in the application and do not reside in the document to which the annotations are being applied. The templates can therefore be stored and manipulated separate from the application and document, as will be discussed in more detail below. The application can determine what annotation types are available by querying annotation template storage and presenting the available types for selection by the user. For example, the application can query a particular directory or a database in which annotation templates are stored.

In response to the request, the application retrieves fixed content, layout information and annotation instructions that are associated with the annotation type (step 120). The instructions define some of the content of the annotation, as described in more detail below. Additionally, the instructions can define in whole or in part how the content is to be arranged or implemented. For example, the instructions can determine some or all of the layout and the appearance of the content (e.g., instead of or in addition to any layout or appearance information defined as a fixed part of the annotation template). The application can retrieve the instructions in the form of a script, such as a script in the JavaScript language or another machine readable code. The instructions for each annotation type can be stored (and retrieved) in a unique annotation template.

In one implementation, the annotation template can be an electronic form. Forms typically include fields that can have associated instructions that specify actions to be performed in the form, such as calculating a value or values to be entered in a form field, performing an action (e.g., retrieving data from a specified location) in response to user input (e.g., selection of a button by a user), or the like. Forms can also be used to transmit data and receive a response. Thus, annotation templates can be implemented as files in a format that supports scriptable electronic forms, such as the Portable Document Format ("PDF"), introduced by Adobe Systems Incorporated of San Jose, Calif. Annotation templates can also include static content that will determine a portion of the appearance (e.g., a background) of annotations instantiated from the type.

The application interprets and/or executes the instructions to create content for a specific instance of the annotation (step 130). Executing the instructions can cause the application to define the variable content, generally by performing any combination of creating, retrieving, arranging, or transforming of data or elements from a source where some or all of the elements are stored, such as the system's memory, external memory, a server or other remote location. Because the annotation is instantiated with content and in some cases a layout, as described below, that is defined at the time the annotation is applied, each instance of a particular annotation type can be created with a different appearance, determined by a condition or conditions at the time it is created, as further described below.

The application creates an instance of the annotation according to the fixed layout information included in the annotation template and, if available, variable layout information defined by the instructions (step 140). The layout information defines the relationships between the different pieces of fixed, variable or fixed and variable content. The fixed content and the variable content are arranged according to the layout information. In one implementation, where the annotation is implemented as an electronic form, creating an annotation instance can include defining an instance of the form having defined values for one or more form fields provided in a template form.

The annotation instance is applied to the document (step 150). To apply the annotation instance, the defined instance is flattened, and the flattened instance is applied to the document. Flattening can include, for example, converting the now-defined annotation content, as well as any fixed content, into a fully static form, such as a bitmap. Generally, the flattened annotation cannot be transformed back into variable content. In some implementations, the user can be provided the option of changing the annotation before the annotation is flattened. Once the annotation is flattened, the annotation cannot be updated when an element on which the annotation was based changes, unlike form fields which may change when a change occurs in the document. Application of the annotation instance can include associating the annotation instance with the electronic document and storing the annotation instance in association with (e.g., within) the document. For example, if the document is a PDF document, the annotation instance can be added as a layer to the PDF document.

Thereafter, when the document is rendered, a representation of the annotation instance is rendered at the location at which the annotation was applied. The application can place the annotation instance in a variety of ways—for example, in response to user input specifying a location for the annotation, based on information included in the original request to apply the annotation, according to a value or rule (e.g., defined by the instructions), or in a predetermined location. For example, if the annotation is placed based on the request, a reference point (e.g., the annotation's center) can be located at a location on the document page where the user activates the pointing device. Alternatively, the application can invoke a rule that defines a location for the annotation—for example, a rule defining an offset distance from the location at which the pointing device was activated. In still another alternative, the instructions themselves can define a location for the annotation based on external conditions, such as the number of times an annotation of the particular annotation type has been previously applied to the electronic document. In some implementations, once the annotation is applied the user can modify the annotation—for example, by moving the annotation to another location or deleting the annotation. In particular implementations, the ability to modify annotations can be restricted according to rights or permissions, such as permissions provided with the application or with the particular document.

In some implementations, a request need not be received from a user, but can be generated automatically, such as in response to an event. Consider, for example, a document that is to be reviewed by more than one user before it is completed. The document can be created by a first user who includes, as a part of the document, a request to apply an annotation each time the document is opened. Generally the request specifies a specific annotation template—for example, a template for an annotation that includes an identification of the user opening the document and the date. Thus, each time that a user opens the document, the annotation template is retrieved and the instructions are executed to define variable content including the date and user identification. An annotation instance is created, as described above, and applied to the document. Each of these annotations is displayed in the document—for example, on the first page—such that each subsequent user who views the document can readily identify all other users who have previously viewed the document, and when the document was viewed.

The instructions for creating the annotation content can cause the application to retrieve data from a variety of locations, such as the system's memory, external memory, a server or other remote location over a network, the document that the annotation is to be applied to, or the user can be prompted to enter information. The data can include any information available to the application, such as the identity of the application user, the date, the document type, the document name, the number or contents of the page on which the annotation is going to be applied, or a serial number or other information retrieved from a local or remote location. The application can use the retrieved data to dynamically define annotation content based on one or more conditions or rules. For example, the application can define the variable content based on a condition related to the state of the document, such as how many times the document has been opened, how many annotations have been applied or how many other users have annotated the document. Alternatively, the condition can be unrelated to the document, or external to the document, such as the date, the time, or a number generated by the application or another application. Some of the content can be defined according to the condition(s) or retrieved information, while some portion of the content can be predefined (i.e., fixed).

The fixed or variable annotation content can include any item that can be presented in an electronic document, such as graphics, text, images, audio, video, hyperlinks, or a combination of two or more of these. Audio and video content can either be in an open (activated) or closed state when the document is opened. If the content is not activated automatically upon opening the document, a user can activate the audio or video by selecting the annotation. Hyperlinks generally must be activated by the user to jump to a linked object. The graphics can be in any suitable form for the application, such as bitmaps, vector art, or raster art. If the appearance of no fixed content is desired, the fixed content can include a transparent frame.

As discussed above, the template can include layout information that defines the spatial relationships between the content. Because this layout information is included in the annotation template, each time an annotation is rendered from a particular annotation template, the layout information causes the application to configure this content in the same way each time. The application template can additionally include instructions defining the annotation layout based on the conditions, such that how the content will be presented is defined and can change from one instance of applying the annotation to another. As an example, an annotation template can include instructions specifying a variable layout for an annotation including a text object and a graphic object, where the relationship of the two objects changes with each application of the annotation moving the text in a clockwise direction in relationship to the graphic each time the annotation is applied. In this example, when the annotation is first applied in a document, the text is positioned in one orientation relative to the graphic—such as above the graphic. When a second annotation is applied in the document using the same annotation template, the text is positioned in a different orientation relative to the graphic—e.g., to the right of the graphic. A global variable can be used to track the number of times the annotation is applied. Other aspects of the appearance of the content, such as the color, size, shape and effects applied to the content, can also be determined by the conditions.

In some implementations, the application can be configured to enable authors to define new dynamic annotation types. The author defines a new annotation type by defining an annotation template. In one implementation, where the annotation template is an electronic form, the author creates the annotation template using conventional form creation techniques, defining one or more form fields with associated instructions, such as scripts, that will be used to define content for the associated fields when an annotation of the type is to be applied. Because the annotation instructions are external to the application, they can be modified by simply modifying the annotation template or file using conventional applications, such as word processors or Adobe® Acrobat® software, without requiring modifications to the application code.

Figure 2:
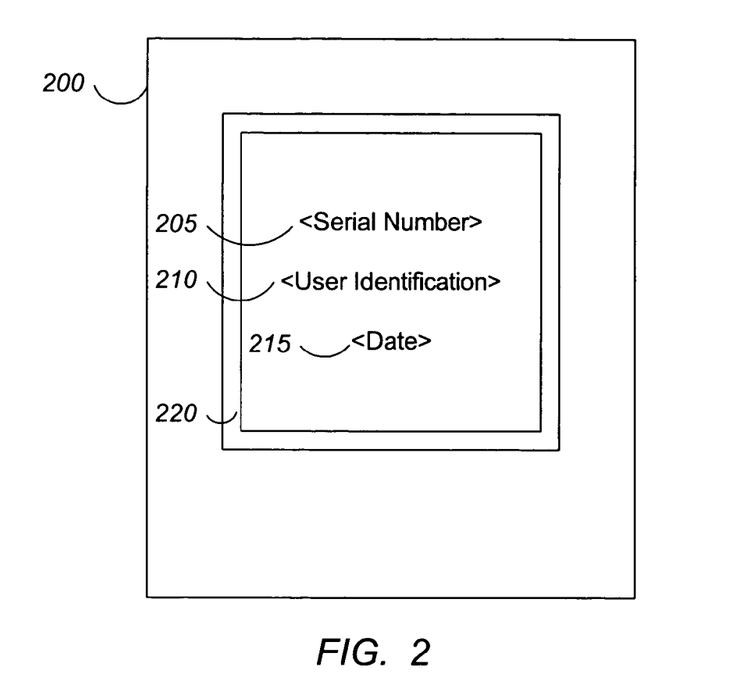
FIG. 2 illustrates an exemplary annotation.

One specific example of applying an annotation to an electronic document will now be described, with reference to FIGS. 2-5. In the following example, an annotation 200 including a serial number 205, a user identifier 210 and a date 215, can be applied to an electronic document, as shown in FIG. 2. The serial number 205 is a unique number that is received from a centralized database, such that multiple users can access the database and each user can apply a unique number. Because the information compiled to create the annotation is retrieved just before application, the annotation will include the most current information available, which is the next number in the series.

Figure 3:
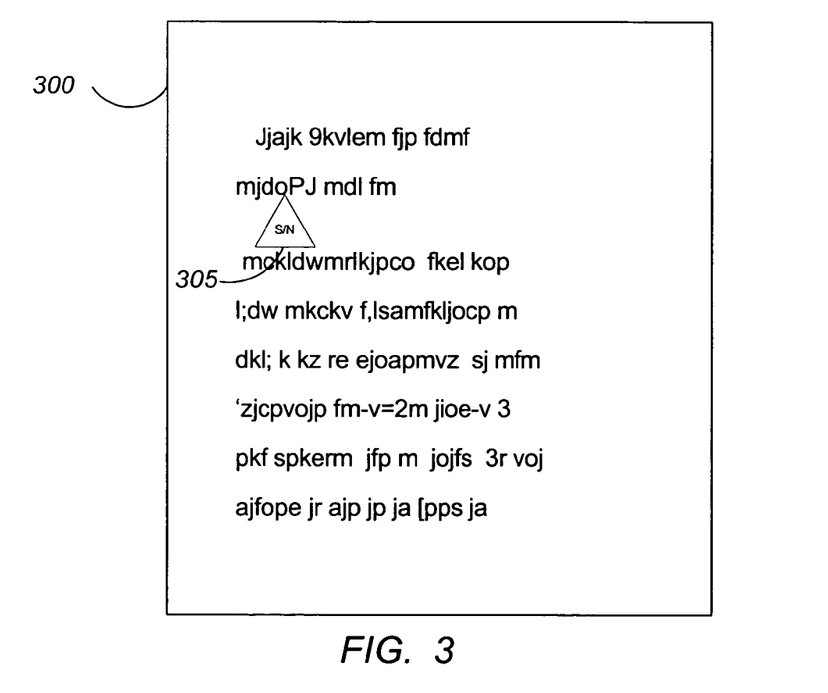
FIG. 3 shows an example of a document to which an annotation can be applied.

As shown in FIG. 3, the user begins by opening the electronic document 300 in an electronic document application. To select an annotation to be applied in the document, the user selects a desired annotation tool—for example, by selecting a corresponding menu item from a pull down menu that identifies all annotation types that are supported by the application and/or the document 300. In this example, the user selects the annotation type "serial number". When the user has selected the desired annotation type, the application changes the appearance of the cursor to indicate that an annotation tool has been selected. The user then specifies where the annotation will be placed by navigating the cursor 305 over a desired paragraph and activating the pointer tool.

The application receives the selection and retrieves an annotation template 400 associated with the "serial number" annotation, as shown in FIG. 4. The template 400 contains the fixed content, a set of instructions that can be executed to define the variable content, and layout information. The application executes a first instruction 405 to retrieve a serial number from a database. A second instruction 410 is executed, which determines a user identifier. In this example, each user identifier includes a job title and number and is a part of the user's login information. The third instruction 415 causes the current time at which the annotation is instantiated to be retrieved.

In addition to the instructions that determine the variable content, the template also includes fixed content 420. In this case, the fixed content 420 defines a rectangular yellow frame. Referring back to FIG. 2, the layout information 425 specifies that the serial number 205 should be placed at the upper center, the user identifier 210 in the middle and the date 215 on the bottom center of the text field. The variable content is then centered on the fixed content 220. In this example, the instructions do not specify additional layout information.

Once all of the instructions that determine the appearance of the annotation have been performed, the annotation content is flattened to define a static appearance of the annotation. The application performs a script that designates the placement of the annotation, which in this example applies the annotation an inch to the right of the paragraph in which the cursor was located when the annotation was selected. The flattened annotation is associated with this location so that each time the document is rendered the annotation appears at the same location. The document, including a layer corresponding to the serial number annotation, can be saved for future access.

Figure 5:
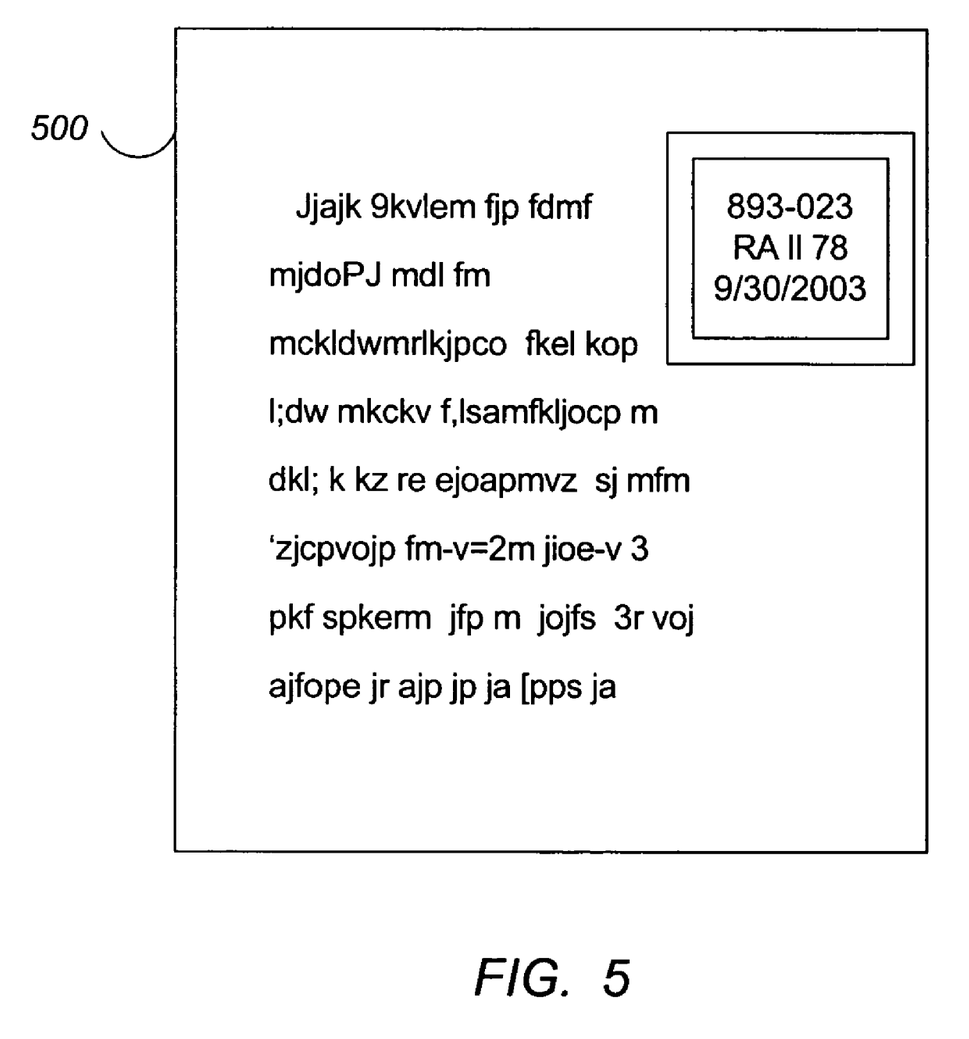
FIG. 5 shows the document with a flattened instance of the annotation.

As shown in FIG. 5, when the user or another viewer later opens the annotated electronic document 500, the annotation is displayed at the location at which it was previously applied.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other commands can be executed by the annotation type's script, including setting button form fields to an arbitrary appearance, changing text, changing form fields, changing the appearance of vector art-based form fields and moving form fields. The shape of the annotation can be non-rectangular. The annotation can be scalable. The annotation can be chosen by selecting a button that causes the actions to be performed. The actions can call the commands that create an annotation. Accordingly, other implementations are within the scope of the following claims.

What is claimed is:

1. A method of creating and applying an annotation to an electronic document, comprising:

receiving in an electronic document application a request to create an annotation to an electronic document;

in response to the request to create the annotation, accessing a dynamic annotation template, the dynamic annotation template being external to the electronic document application and the electronic document, the dynamic annotation template having fixed content, associated instructions defining variable content, and variable layout information for the fixed content and the variable content;

creating an instance of the annotation using the variable layout information included in the annotation template, the variable layout information defining the layout for the fixed content and the variable content, the annotation instance being stored within the electronic document; and displaying the annotation instance in the electronic document, the annotation instance having an appearance, including a variable layout, defined by the variable content, the fixed content, and the variable layout information.

2. The method of claim 1, further comprising:

executing the associated instructions to define the variable content, wherein executing the associated instructions includes:

determining a condition based on a state of a system hosting the electronic document application, the electronic document application, or the electronic document; and defining at least a part of the variable content based on the determined condition.

3. The method of claim 2, wherein:

executing the associated instructions to define variable content includes generating one or more graphics.

4. The method of claim 2, wherein executing the associated instructions to define variable content includes:

requesting a service from a remote location;

receiving content information in response to the request; and incorporating the content information into the variable content.

5. The method of claim 2, wherein:

executing the associated instructions to define variable content includes receiving user input defining a value.

6. The method of claim 2, wherein:

executing the associated instructions to define variable content includes defining an appearance of one or more graphics.

7. The method of claim 2, wherein:

executing the associated instructions to define variable content includes obtaining one or more of a graphic, text, an image, audio, video, or a hyperlink.

8. The method of claim 1, wherein accessing the dynamic annotation template includes:

retrieving an electronic form.

9. The method of claim 8, wherein:

the electronic form includes one or more form fields having associated scripts.

10. The method of claim 1, further comprising:

flattening the annotation content to create a static instance of the annotation; and wherein displaying the instance in the electronic document creates a fixed representation of the instance of the annotation.

11. The method of claim 1, wherein:

displaying the instance of the annotation includes associating the annotation instance with a specific location in the electronic document.

12. The method of claim 1, wherein the associated instructions include instructions to retrieve a serial number from a centralized database, the centralized database being accessible to multiple users.

13. The method of claim 1, wherein the request to create the annotation is generated automatically in response to an event.

14. The method of claim 1, wherein after the annotation instance is displayed in the electronic document, the annotation instance is modifiable by any user having appropriate rights or permissions.

15. A computer program product on a computer readable storage device for creating and applying an annotation to an electronic document, the computer program product comprising instructions operable to cause data processing apparatus to perform operations comprising:

receiving in an electronic document application a request to create an annotation in an electronic document;

in response to the request to create the annotation, accessing a dynamic annotation template, the dynamic annotation template being external to the electronic document application and the electronic document, the dynamic annotation template having fixed content, associated instructions defining variable content, and variable layout information for the fixed content and the variable content;

creating an instance of the annotation using the variable layout information included in the annotation template, the variable layout information defining the layout for the fixed content and the variable content, the annotation instance being stored within the electronic document; and displaying the annotation instance in the electronic document, the annotation instance having an appearance, including a variable layout, defined by the variable content, the fixed content, and the variable layout information.

16. The computer program product of claim 15, further comprising:

executing the associated instructions to define the variable content wherein executing the associated instructions to define the variable content includes:

determining a condition based on a state of a system hosting the electronic document application, the electronic document application, or the electronic document; and defining at least a part of the variable content based on the determined condition.

17. The computer program product of claim 16, wherein executing the associated instructions to define the variable content further comprises generating one or more graphics.

18. The computer program product of claim 16, wherein executing the associated instructions to define the variable content further comprises:

requesting a service from a remote location;

receiving content information in response to the request; and incorporating the content information into the variable content.

19. The computer program product of claim 16, wherein executing the associated instructions to define the variable content further comprises receiving user input defining a value.

20. The computer program product of claim 16, wherein executing the associated instructions to define the variable content further comprises defining an appearance of one or more graphic.

21. The computer program product of claim 16, wherein executing the associated instructions to define the variable content further comprises:

obtaining one or more of a graphic, text, an image, audio, video, or a hyperlink.

22. The computer program product of claim 15, wherein accessing the dynamic annotation template further comprises retrieving an electronic form.

23. The computer program product of claim 22, wherein:

the electronic form includes one or more form fields having associated scripts.

24. The computer program product of claim 15, further comprising instructions to cause a computer system to:

flatten the annotation content to create a static instance of the annotation; and wherein the instructions to display the instance in the electronic document create a fixed representation of the instance of the annotation.

25. The computer program product of claim 15, wherein the instructions to display the instance include instructions to cause a computer system to:

associate the annotation instance with a specific location in the electronic document.

26. The computer program product of claim 15, wherein the associated instructions include instructions to retrieve a serial number from a centralized database, the centralized database being accessible to multiple users.

27. The computer program product of claim 15, wherein the request to create the annotation is generated automatically in response to an event.

28. The computer program product of claim 15, wherein after the annotation instance is displayed in the electronic document, the annotation instance is modifiable by any user having appropriate rights or permissions.

29. A method of creating and applying an annotation to an electronic document, comprising:
- accessing a dynamic annotation template, wherein the dynamic annotation template includes variable layout information used to define a layout of a corresponding annotation instance;
- creating a plurality of annotation instances using the variable layout information included in the dynamic annotation template, the plurality of annotation instances being stored within the electronic document;
- displaying a first annotation instance in a first portion of an electronic document in accordance with the dynamic annotation template; and
- displaying a second annotation instance in a second portion of the electronic document in accordance with the dynamic annotation template, wherein the layout of the second annotation instance differs from the layout of the first annotation instance, and wherein the first annotation instance and the second annotation instance are each one of the plurality of annotation instances being stored within the electronic document.

30. The method of claim 29, wherein:
- the first annotation instance and the second annotation instance each include a text object and a graphic object; and
- an arrangement of the text object relative to the graphic object differs between the first annotation instance and the second annotation instance.

31. The method of claim 30, wherein:
- at least one of the text object and the graphic object comprise variable content.

32. The method of claim 30, wherein:
- the graphic object comprises one of a bitmap, vector art, or raster art.

33. The method of claim 29, wherein:
- the dynamic annotation template comprises one or more form fields having executable instructions to define variable content.

34. A system comprising:
- a device hosting an electronic document application; and
- processor electronics configured to perform operations comprising:
  - receiving in the electronic document application a request to create an annotation in an electronic document;
  - in response to the request to create the annotation, accessing a dynamic annotation template, the dynamic annotation template being external to the electronic document application and the electronic document, the dynamic annotation template having fixed content, associated instructions defining variable content, and variable layout information for the fixed content and the variable content;
  - creating an instance of the annotation using the variable layout information included in the annotation template, the variable layout information defining the layout for the fixed content and the variable content, the annotation instance being stored within the electronic document; and
  - displaying the annotation instance in the electronic document, the annotation instance having an appearance, including a variable layout, defined by the variable content, the fixed content, and the variable layout information.

35. The system of claim 34, further comprising:
- executing the associated instructions to define the variable content, wherein the processor electronics are configured to perform operations including:
  - determining a condition based on a state of the device hosting the electronic document application, the electronic document application, or the electronic document; and
  - defining at least a part of the variable content based on the determined condition.

36. The system of claim 35, wherein the processor electronics are further configured to perform operations comprising executing the associated instructions to generate one or more graphics.

37. The system of claim 35, wherein the processor electronics are further configured to perform operations comprising:
- requesting a service from a remote location;
- receiving content information in response to the request; and
- incorporating the content information into the variable content.

38. The system of claim 35, further comprising an interface to receive user input, wherein the processor electronics are further configured to perform operations comprising executing the associated instructions to receive user input defining a value.

39. The system of claim 35, wherein the processor electronics are further configured to perform operations comprising executing the associated instructions to define an appearance of one or more graphics.

40. The system of claim 35, wherein the processor electronics are further configured to perform operations comprising executing the associated instructions to obtain one or more of a graphic, text, an image, audio, video, or a hyperlink.

41. The system of claim 34, wherein accessing the dynamic annotation template includes retrieving an electronic form.

42. The system of claim 41, wherein the electronic form includes one or more form fields having associated scripts.

43. The system of claim 34, wherein the processor electronics are further configured to perform operations comprising:
- flattening the annotation content to create a static instance of the annotation, wherein displaying the static instance creates a fixed representation of the static instance of the annotation.

44. The system of claim 34, wherein the processor electronics are further configured to perform operations comprising associating the annotation instance with a specific location in the electronic document.

45. The system of claim 34, wherein the associated instructions include instructions to retrieve a serial number from a centralized database, the centralized database being accessible to multiple users.

46. The system of claim 34, wherein the request to create the annotation is generated automatically in response to an event.

47. The system of claim 34, wherein after the annotation instance is displayed in the electronic document, the annotation instance is modifiable by any user having appropriate rights or permissions.

* * * * *

UNITED STATES PATENT AND TRADEMARK OFFICE
CERTIFICATE OF CORRECTION

PATENT NO. : 7,418,656 B1 Page 1 of 1
APPLICATION NO. : 10/678392
DATED : August 26, 2008
INVENTOR(S) : Scott E. Petersen It is certified that error appears in the above-identified patent and that said Letters Patent is hereby corrected as shown below:

Title Page; item (54);
Title: replace "Dynamic Annotations For Electronics Documents" with --Dynamic Annotations For Electronic Documents--.

Signed and Sealed this

Thirteenth Day of January, 2009

JON W. DUDAS
*Director of the United States Patent and Trademark Office*

UNITED STATES PATENT AND TRADEMARK OFFICE
CERTIFICATE OF CORRECTION

PATENT NO. : 7,418,656 B1  Page 1 of 1
APPLICATION NO. : 10/678392
DATED : August 26, 2008
INVENTOR(S) : Scott E. Petersen

It is certified that error appears in the above-identified patent and that said Letters Patent is hereby corrected as shown below:

Title Page; item (54) and Column 1, lines 1 and 2;
Title: replace "Dynamic Annotations For Electronics Documents" with --Dynamic Annotations For Electronic Documents--.

This certificate supersedes the Certificate of Correction issued January 13, 2009.

Signed and Sealed this

Third Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,418,656 B1  Page 1 of 1
APPLICATION NO. : 10/678392
DATED : August 26, 2008
INVENTOR(S) : Scott E. Petersen It is certified that error appears in the above-identified patent and that said Letters Patent is hereby corrected as shown below:

Title Page; item (54) and Column 1, lines 1 and 2;
Title: replace "Dynamic Annotations For Electronics Documents" with --Dynamic Annotations For Electronic Documents--.

Column 10, claim 16, line 15, after "content" insert --,--.

Column 10, claim 20, line 40, delete "graphic." and replace with --graphics.--.

This certificate supersedes the Certificates of Correction issued January 13, 2009 and February 3, 2009.

Signed and Sealed this

Twenty-fourth Day of February, 2009

JOHN DOLL
*Acting Director of the United States Patent and Trademark Office*